United States Patent
Bates et al.

(10) Patent No.: US 8,054,730 B2
(45) Date of Patent: Nov. 8, 2011

(54) APPARATUS AND METHOD TO STORE INFORMATION IN A HOLOGRAPHIC DATA STORAGE MEDIUM

(75) Inventors: Allen Keith Bates, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/848,939

(22) Filed: Aug. 2, 2010

(65) Prior Publication Data

US 2010/0296381 A1 Nov. 25, 2010

Related U.S. Application Data

(62) Division of application No. 11/689,402, filed on Mar. 21, 2007, now Pat. No. 7,773,275.

(51) Int. Cl.
*G11B 7/00* (2006.01)
(52) U.S. Cl. ........................................................ 369/103
(58) Field of Classification Search .................... 359/22; 369/103
See application file for complete search history.

(56) References Cited

U.S. PATENT DOCUMENTS

| | | | |
|---|---|---|---|
| 4,988,194 A | 1/1991 | Hara et al. | |
| 6,028,620 A | 2/2000 | Yin | |
| 6,233,083 B1 | 5/2001 | Minagawa et al. | |
| 6,922,385 B2 | 7/2005 | Edwards | |
| 7,031,038 B2 | 4/2006 | Ogasawara et al. | |
| 7,116,626 B1 | 10/2006 | Woods et al. | |
| 2004/0037196 A1 | 2/2004 | Matsumoto et al. | |
| 2004/0061966 A1 | 4/2004 | Berger et al. | |
| 2004/0156297 A1 | 8/2004 | Edwards | |
| 2004/0218237 A1 | 11/2004 | Berstis | |
| 2005/0147013 A1 | 7/2005 | Tateishi et al. | |
| 2005/0162719 A1 | 7/2005 | Ogasawara et al. | |
| 2005/0243690 A1 | 11/2005 | Lee et al. | |
| 2006/0077882 A1 | 4/2006 | Lee et al. | |
| 2006/0215527 A1 | 9/2006 | Uchida et al. | |
| 2007/0050569 A1 | 3/2007 | Haustein et al. | |
| 2008/0008076 A1* | 1/2008 | Raguin et al. ................ | 369/103 |
| 2008/0205238 A1 | 8/2008 | Hwang et al. | |

FOREIGN PATENT DOCUMENTS

| | | |
|---|---|---|
| EP | 1562185 | 8/2005 |
| JP | 62024218 | 2/1987 |
| JP | 2005242304 | 9/2005 |
| KR | 1020070008274 | 1/2007 |

OTHER PUBLICATIONS

"The Laser Turntable", Laser Vinyl.

* cited by examiner

*Primary Examiner* — Alessandro Amari
(74) *Attorney, Agent, or Firm* — Dale F. Regelman; Quarles & Brady LLP

(57) ABSTRACT

A method is disclosed to store information in a holographic data storage medium. The method provides a hologram comprising an alignment pattern, and disposes that hologram into a holographic data storage medium during manufacture.

2 Claims, 18 Drawing Sheets

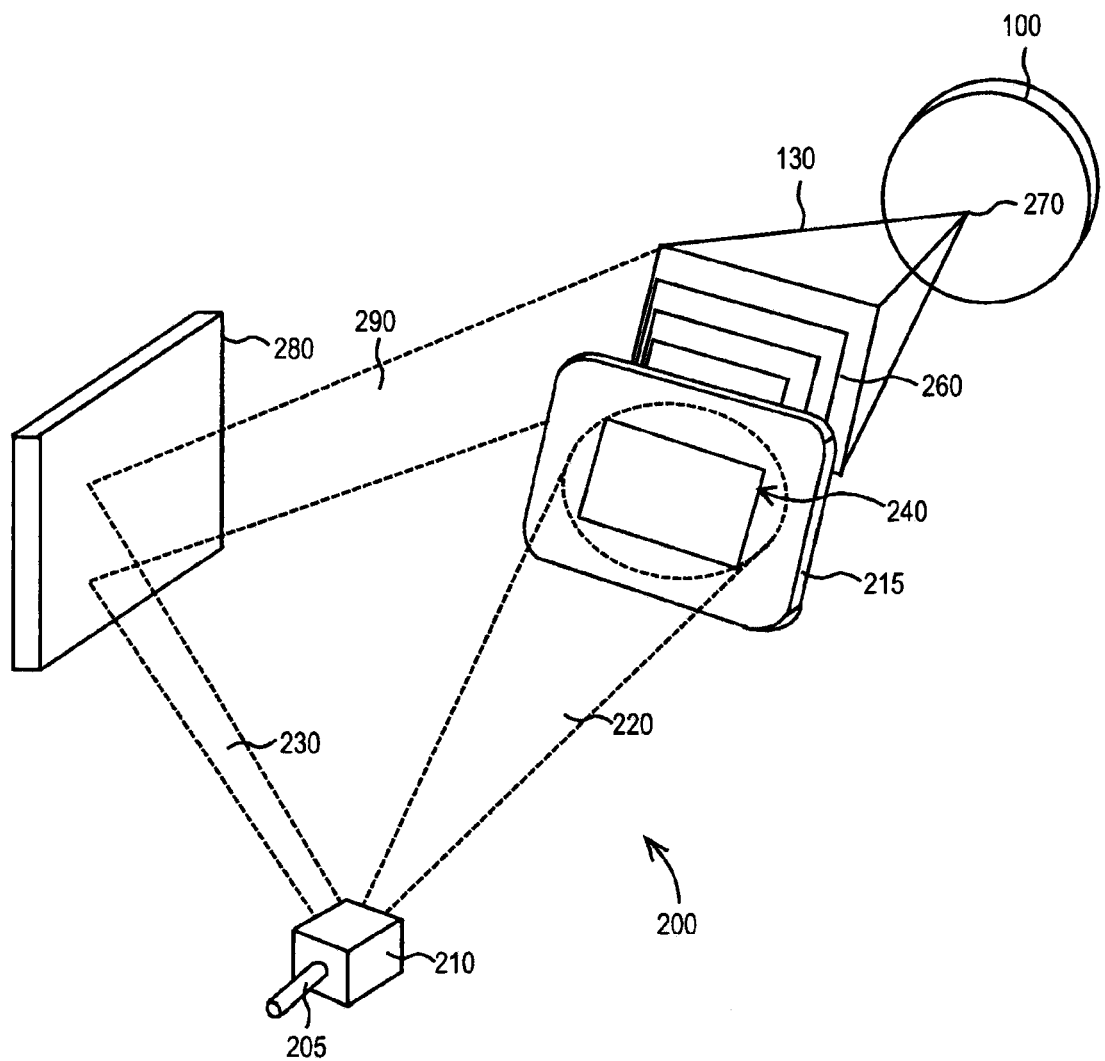

APPARATUS AND METHOD TO STORE INFORMATION IN A HOLOGRAPHIC DATA STORAGE MEDIUM

CROSS-REFERENCE TO RELATED APPLICATIONS

This Application is a Divisional Application claiming priority from the Application having Ser. No. 11/689,402 filed Mar. 21, 2007.

FIELD OF THE INVENTION

This invention relates to an apparatus and method to store information in a holographic data storage medium.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce, for example a simple collimated beam with a planar wavefront.

The resulting optical interference pattern causes chemical and/or physical changes in the photosensitive medium: a replica of the interference pattern is stored as a change in the absorption, refractive index, or thickness of the photosensitive medium. When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

The invention comprises a holographic drive apparatus, comprising a housing, a laser light source disposed within the housing, a beam splitter disposed within the housing, a reflective spatial light modulator disposed within the housing, and a drive servo mechanism disposed within the housing. In certain embodiments, the holographic drive apparatus further comprises an optical sensor array disposed within the housing, wherein that wherein said optical sensor array comprises a rotatable input screen, a rotation error servo, a rotatable shaft extending outwardly from the rotation error servo, wherein the distal end of the rotatable shaft is attached to the rotatable input screen.

The invention further comprises a method to store information holographically, using the holographic drive apparatus. The method receives information, mounts a holographic data storage medium in the holographic drive apparatus, rotates the holographic data storage medium, encodes in the rotating holographic data storage medium a first hologram comprising an alignment pattern, encodes in the rotating holographic data storage medium one or more data holograms comprising the information, and encodes in the rotating holographic data storage medium a second hologram comprising the alignment pattern.

The invention further comprises a method to read information holographically, using the holographic drive apparatus. The method mounts an encoded holographic data storage medium in the holographic drive apparatus, rotates the holographic data storage medium at an angular rotation $\phi$, rotating the input screen at the angular rotation $\phi$, illuminates the rotated encoded holographic data storage medium with a reference beam to produce a data beam, and projects the data beam onto the rotating input screen.

BRIEF DESCRIPTION OF THE DRAWINGS

The invention will be better understood from a reading of the following detailed description taken in conjunction with the drawings in which like reference designators are used to designate like elements, and in which:

FIG. 2 is a perspective view of a one embodiment of a holographic data storage system shown encoding information into the holographic data storage medium of FIGS. 1A and 1B;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
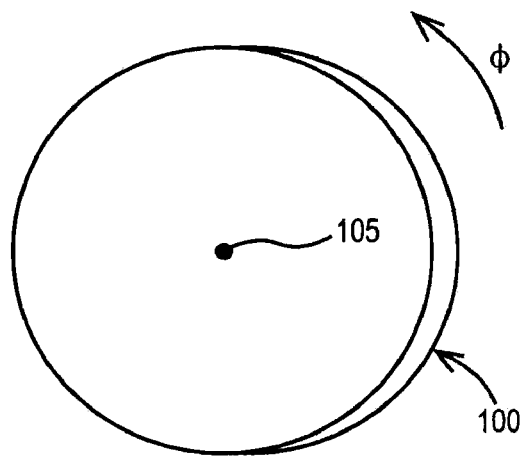
FIG. 1A is perspective view of a holographic data storage medium.
Figure 1B:
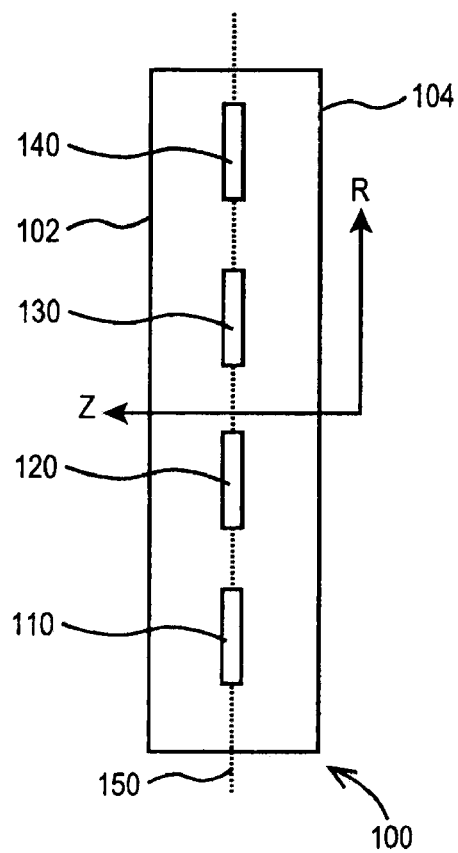
FIG. 1B is a cross-sectional view of the holographic data storage medium of FIG. 1A.

Referring now to FIG. 2, holographic data storage system 200 comprises laser light source 205, a beam splitter 210, transmissive Spatial Light Modulator ("SLM") 215, and mirror 280. In certain embodiments, laser 205 emits blue light at a wavelength of about 405 nm. In certain embodiments, laser 205 emits or red light at a wavelength of about 650 nm. In certain embodiments, laser 205 emits or infrared light at a wavelength of about 780 nm. In certain embodiments, laser 205 emits other wavelength(s) of light tuned to the recording and/or reading characteristics of holographic data storage medium 100 (FIGS. 1A, 1B).

In certain embodiments, transmissive SLM 215 comprises an LCD-type device. Information is represented by either a light or a dark pixel on the SLM 215 display. The SLM 215 is typically translucent.

Laser light originating from the laser source 205 is split by the beam splitter 210 into two beams, a carrier beam 220 and a reference beam 230. The carrier beam 220 picks up the image 240 displayed by the SLM 215 as the light passes through the SLM 215 to form data beam 260. Reference beam 230 is reflected off of first-surface mirror 280, to form reflected reference beam 290. Reflected reference beam 290 interferes with the data beam 260 to form data hologram 130. Data hologram 130 is encoded into holographic storage medium 100 as interference pattern 270.

Figure 3:
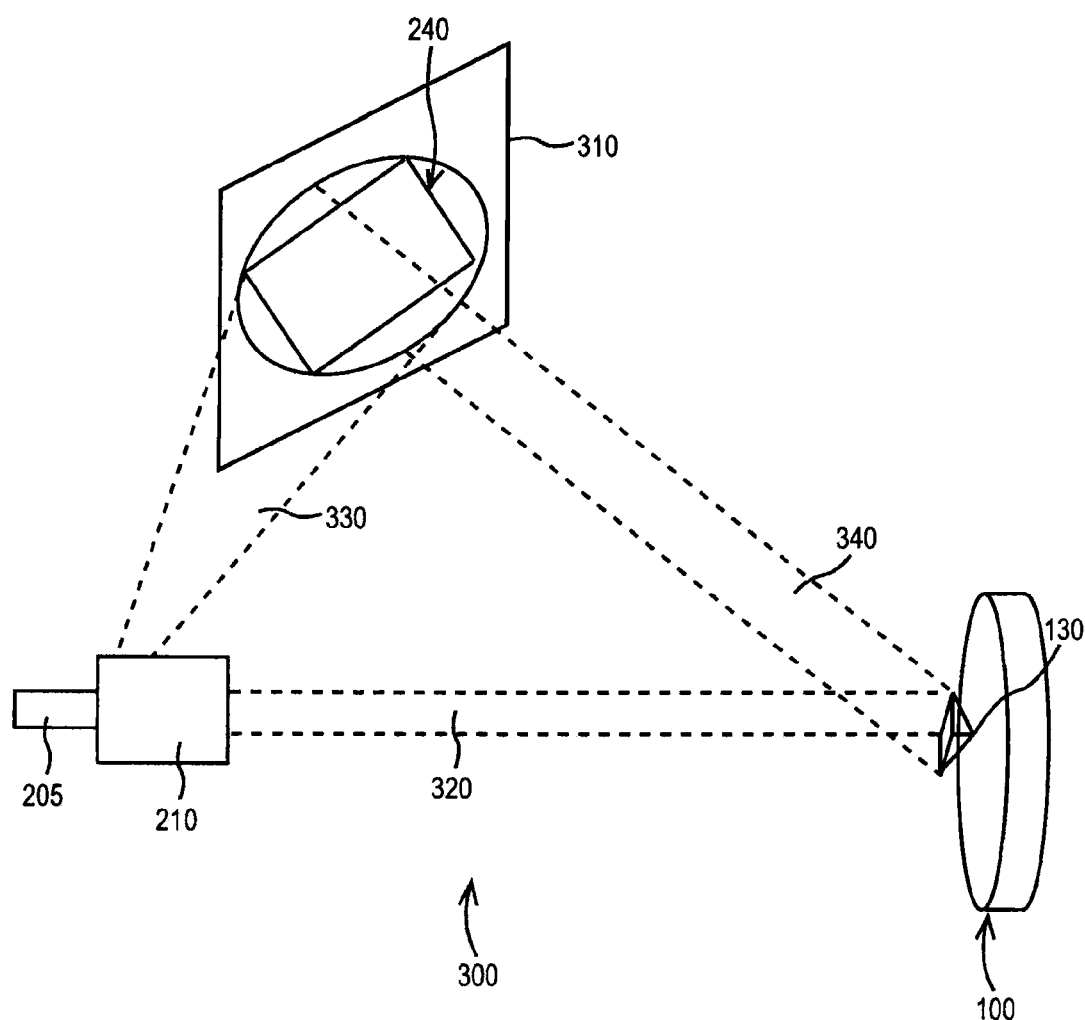
FIG. 3 is a perspective view of a second embodiment of a holographic data storage system shown encoding information into the holographic data storage medium of FIGS. 1A and 1B.
Figure 4:
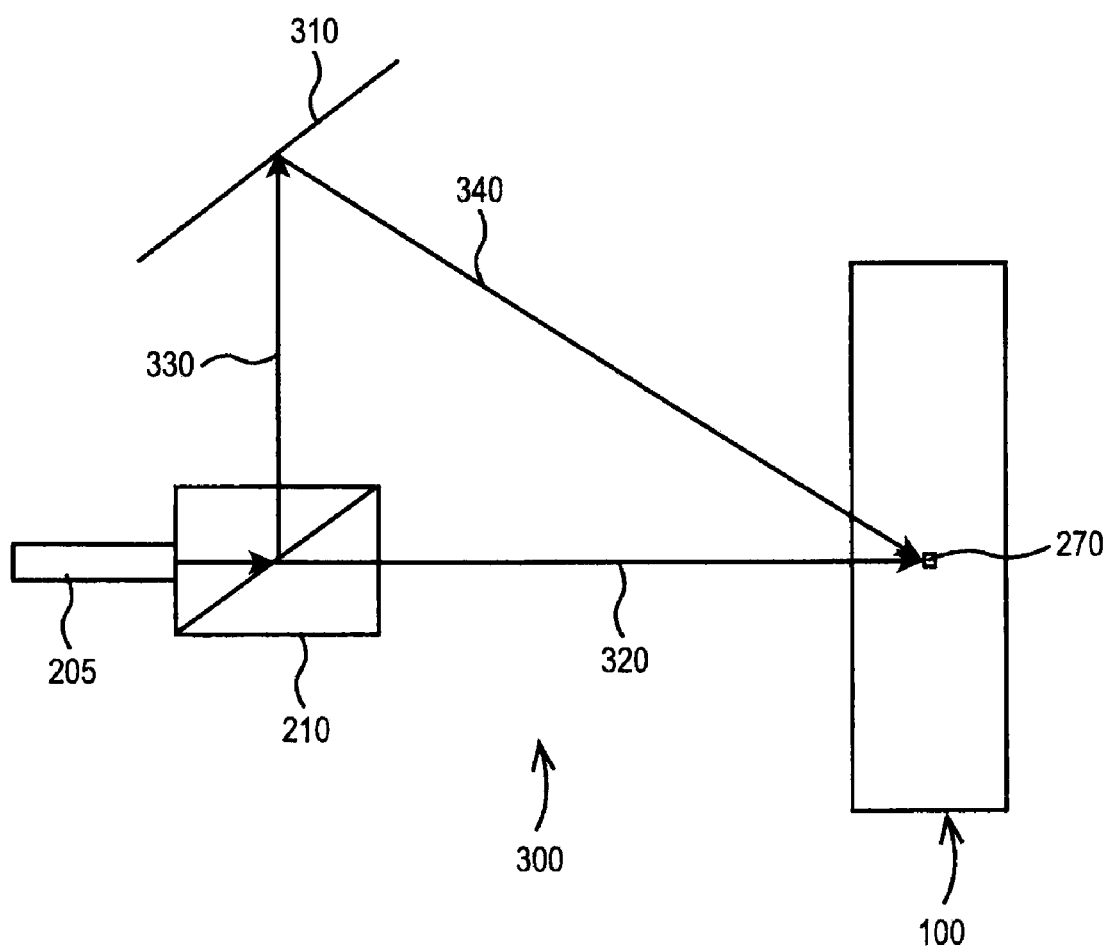
FIG. 4 is a block diagram showing the holographic data storage system of FIG. 3.

Referring now to FIGS. 3 and 4, holographic data storage system 300 comprises laser light source 205, beam splitter 210, reflective spatial light modulator 310, and holographic storage medium 100. The light generated by source 205 is split by beam splitter 210 into reference beam 320, and carrier beam 330. Using Apparatus 300, reference beam 320 is not reflected.

In the illustrated embodiment of FIG. 3, reflective spatial light modulator ("RSLM") 310 displays data image 240. In certain embodiments, reflective spatial light modulator 310 comprises an assembly comprising a plurality of micro mirrors. In other embodiments, reflective spatial light modulator 310 comprises a liquid crystal on silicon ("LCOS") display device. In contrast to nematic twisted liquid crystals used in LCDs, in which the crystals and electrodes are sandwiched between polarized glass plates, LCOS devices have the liquid crystals coated over the surface of a silicon chip. The electronic circuits that drive the formation of the image are etched into the chip, which is coated with a reflective (aluminized) surface. The polarizers are located in the light path both before and after the light bounces off the chip. LCOS devices are easier to manufacture than conventional LCD displays. LCOS devices have higher resolution because several million pixels can be etched onto one chip. LCOS devices can be much smaller than conventional LCD displays.

Carrier beam 330 picks up image 240 as the light is reflected off reflective spatial light modulator 310 to form reflected data beam 340 comprising image 240. Unreflected reference beam 320 interferes with reflected data beam 340 to form data hologram 130. Interference pattern 270 encodes data hologram 130, and is formed within holographic storage medium 100 thereby causing the photo-active storage medium to create interference pattern 270.

Figure 5:
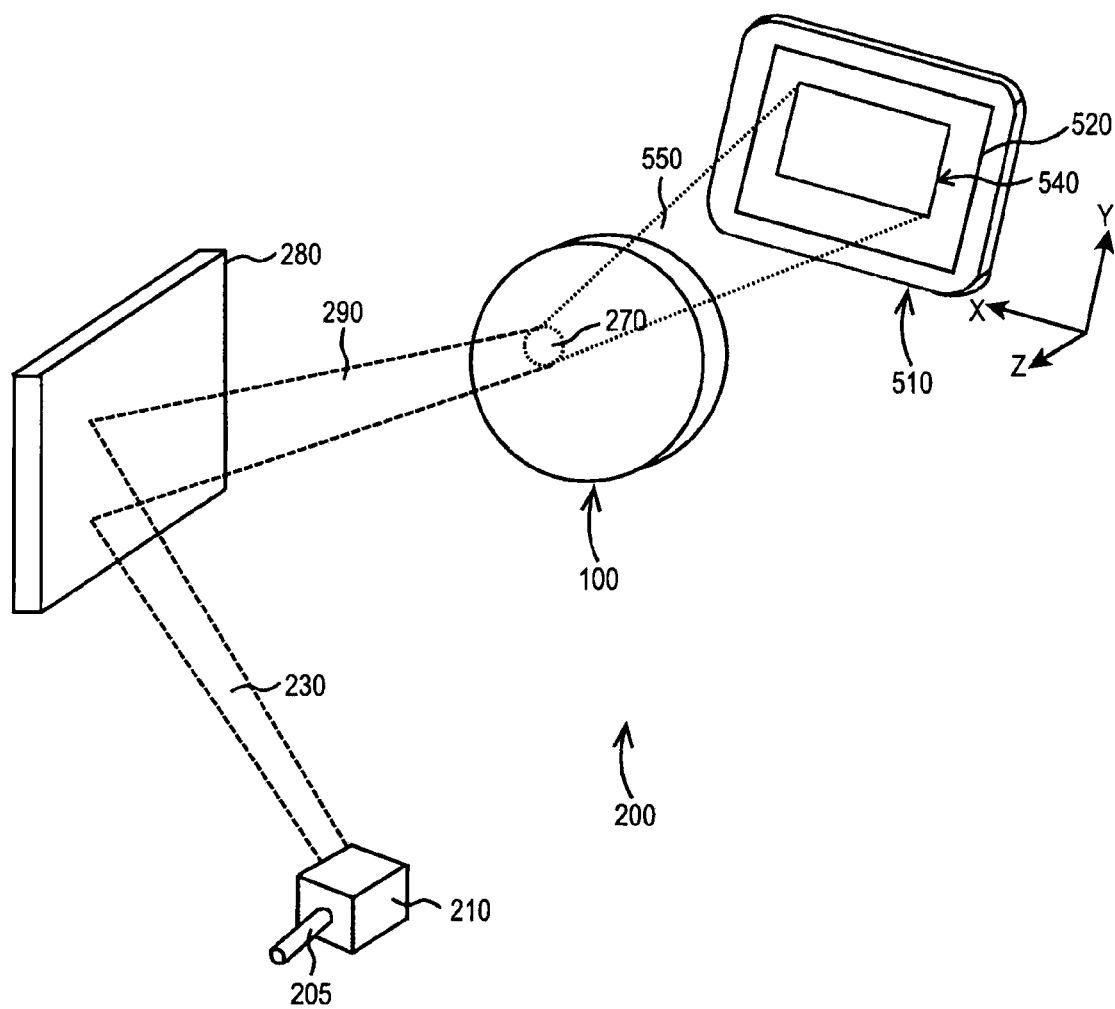
FIG. 5 is a perspective view of a one embodiment of a holographic data storage system shown decoding information encoded into the holographic data storage medium of FIGS. 1A and 1B.

FIG. 5 illustrates holographic data storage system 200 decoding interference pattern 270 stored in media 100. In the illustrated embodiment of FIG. 5, holographic data storage system 200 comprises optical sensor array 510. Optical sensor array 510 is disposed a distance away from holographic storage medium 100 sufficient to digitally capture the reconstructed data beam 550 projected upon it. To decode interference pattern 270 (FIG. 2), reference beam 230 is reflected off of mirror 280, to form reflected reference beam 290, which is then incident on the encoded holographic storage medium 100. As the reference beam 290 interferes with interference pattern 270, a reconstructed data beam 550 is generated, wherein that reconstructed data beam 550 comprises an image 540 resembling the original image 240. Optical sensor array 510 digitally captures the information comprising image 540 on input screen 520.

Figure 8A:
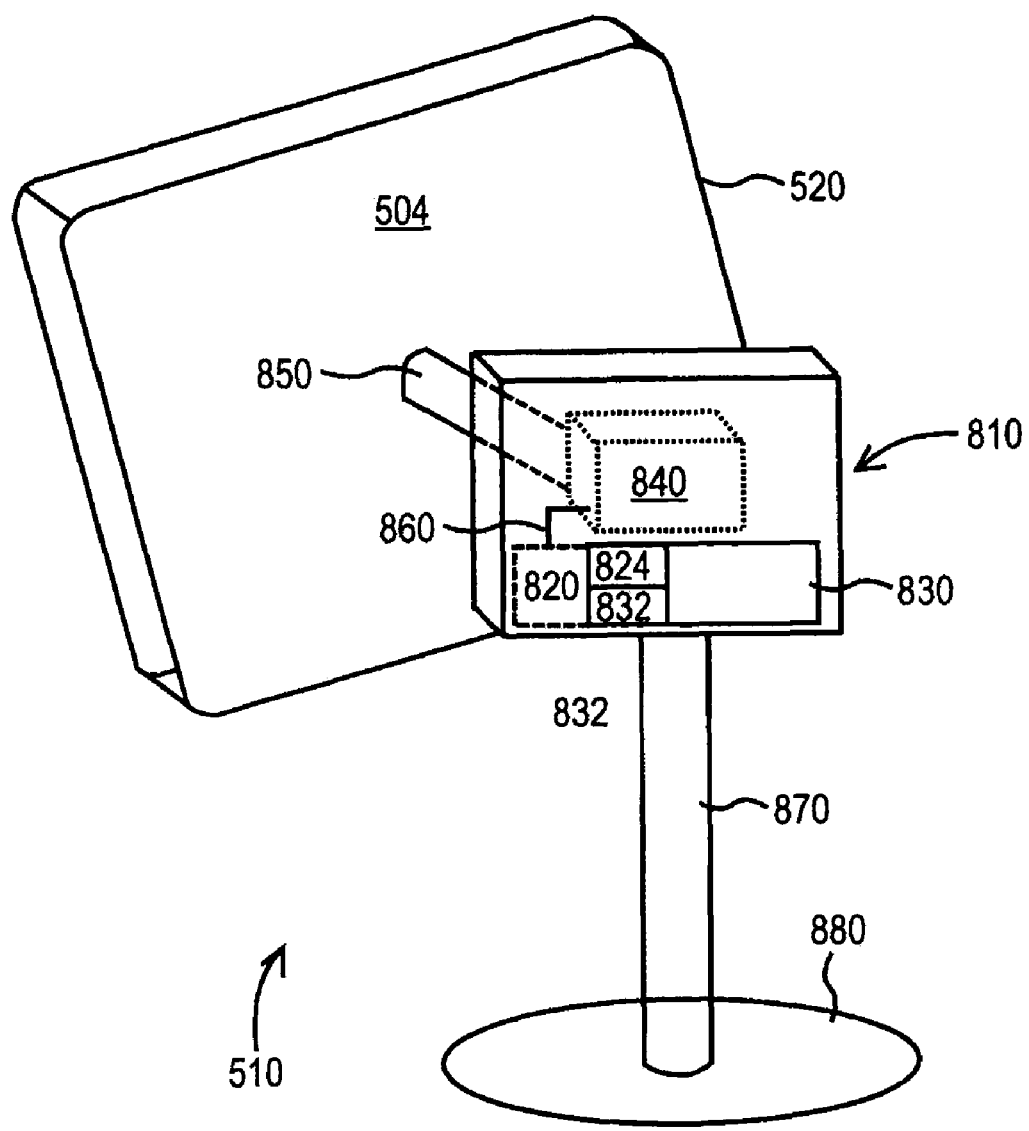
FIG. 8A is a perspective view of a portion of one embodiment of Applicants' optical detector.
Figure 8B:
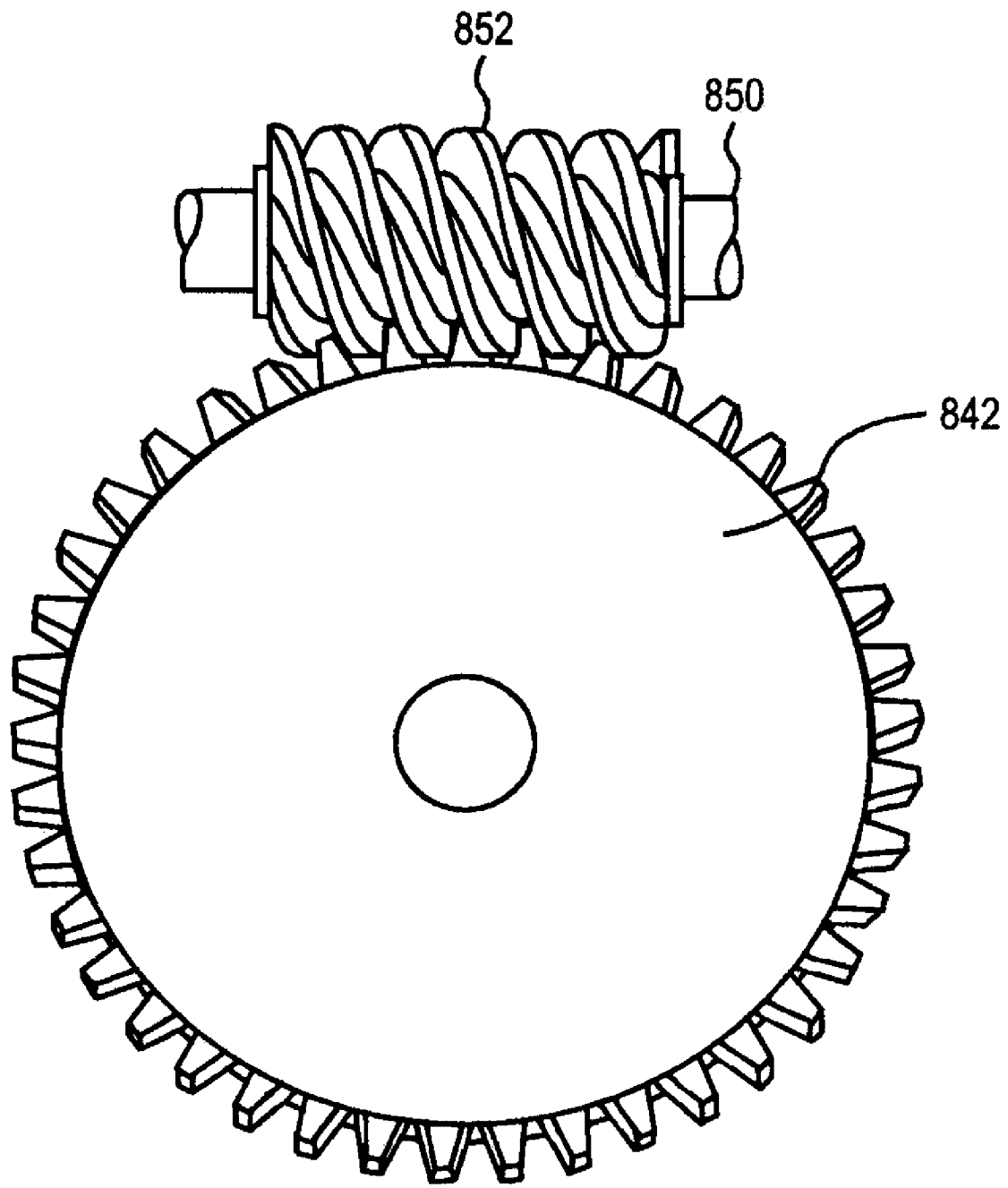
FIG. 8B shows a worm gear portion of the optical detector of FIG. 8A.
Figure 8C:
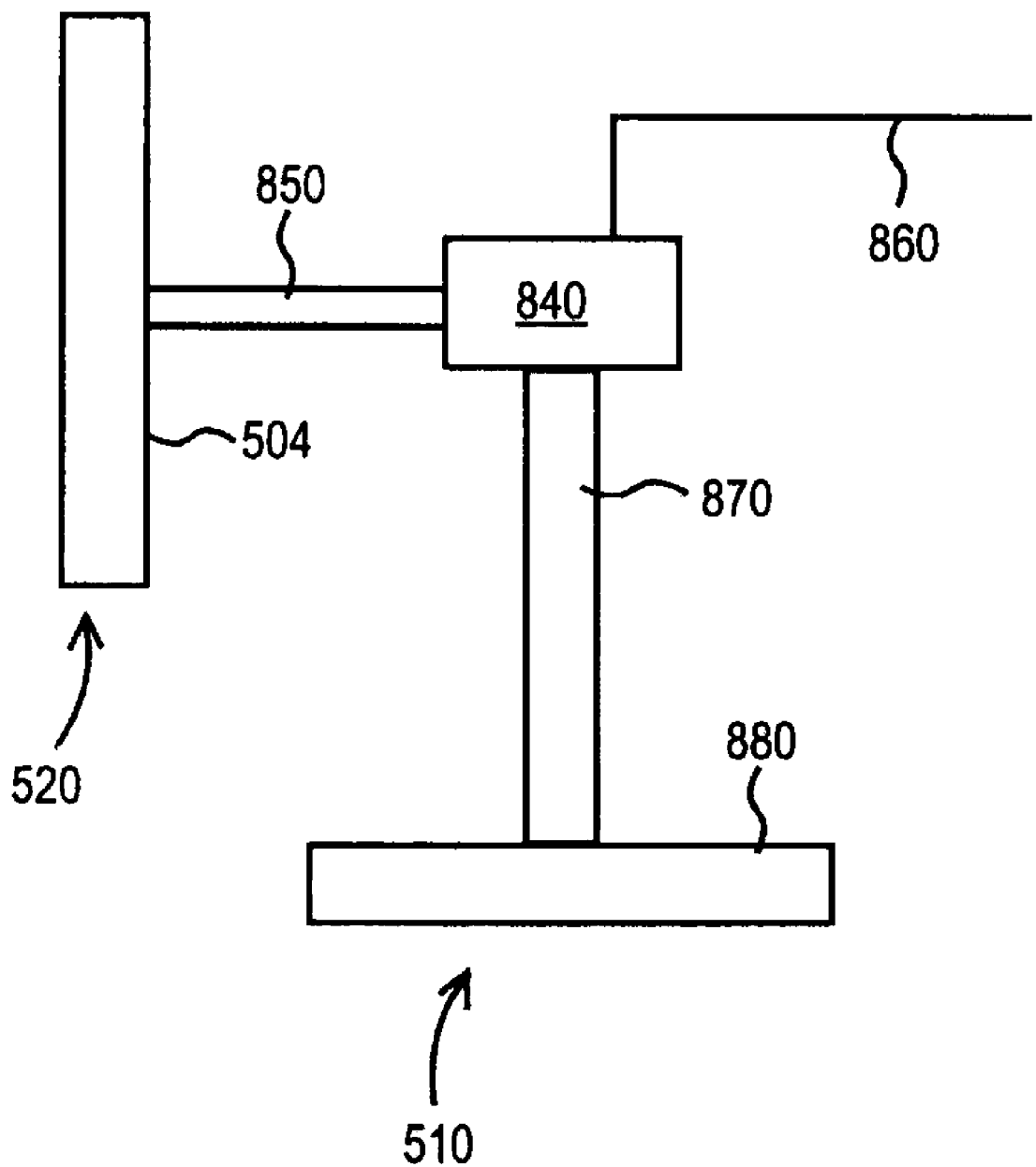
FIG. 8C shows a perspective view of a second embodiment of Applicants' optical detector.

Referring now to FIGS. 8A, 8B, and 8C, optical sensor array 510 further comprises rotation-error-servo ("RES") 840. As those skilled in the art will appreciate, a servo comprises a device comprising an external shaft, such as rotatable shaft 850. Referring now to FIG. 8B, in certain embodiments RES 840 comprises a rotatable worm wheel 842, and shaft 850 comprises a spirally-threaded portion 852, wherein spiral-threaded portion 852 meshes with worm wheel 842.

Rotatable shaft 850 can be positioned to specific angular positions by sending RES 840 a pre-defined coded signal. As long as that coded signal exists on input line 860, RES 840 will maintain the associated angular position of shaft 850. As the coded signal changes, the angular position of the shaft 850 changes.

RES 840 is interconnected by rotatable shaft 850 to rear portion 504 of input screen 520. RES 840 can cause input screen 520 to rotate in a first direction, i.e. clockwise, or to rotate in a second and opposite direction, i.e. counter-clockwise, by causing rotatable shaft 850 to rotate in the first direction or in the second direction, respectively.

In the illustrated embodiment of FIG. 8A, optical sensor array 510 further comprises detector controller 810, wherein RES 840 is disposed within detector controller 810. In the illustrated embodiment of FIG. 8A, detector controller 810 further comprises processor 820 and memory 830. In certain embodiments, memory 830 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

Figure 7:
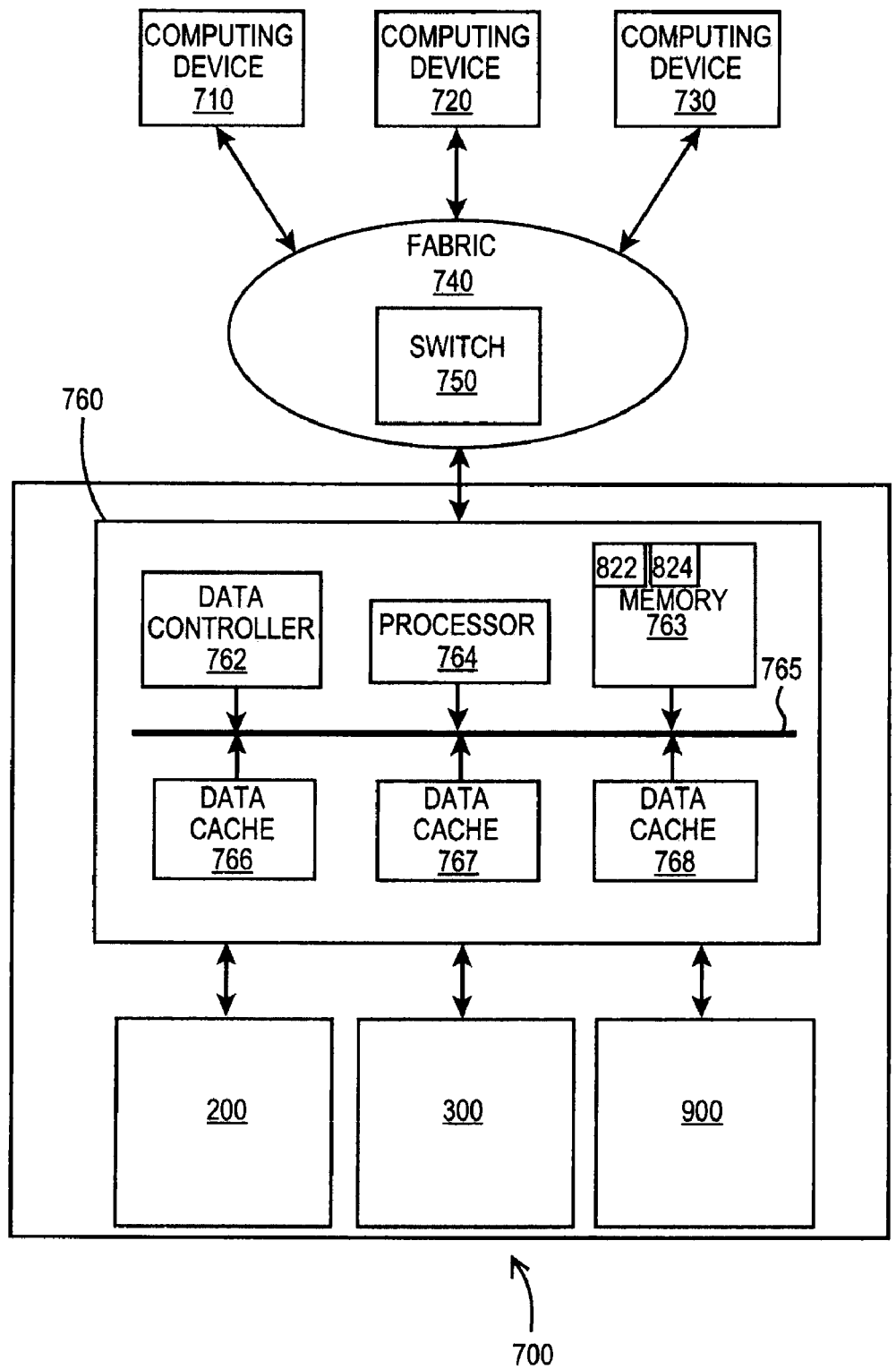
FIG. 7 is a block diagram showing one embodiment of Applicants' holographic data storage system.

In the illustrated embodiment of FIG. 8A, detector controller 810 further comprises microcode 832, wherein microcode 832 is written to memory 830. Processor 820 utilizes microcode 832 to operate optical sensor array 510. In the illustrated embodiment of FIG. 8C, signal input line 860 interconnects RES 840 with an external controller, such as storage controller 760 (FIG. 7). In certain embodiments, optical sensor array 510 further comprises a floor stand 880 and vertical pillar 870. Pillar 870 may be at any angle other than vertical.

Figure 6:
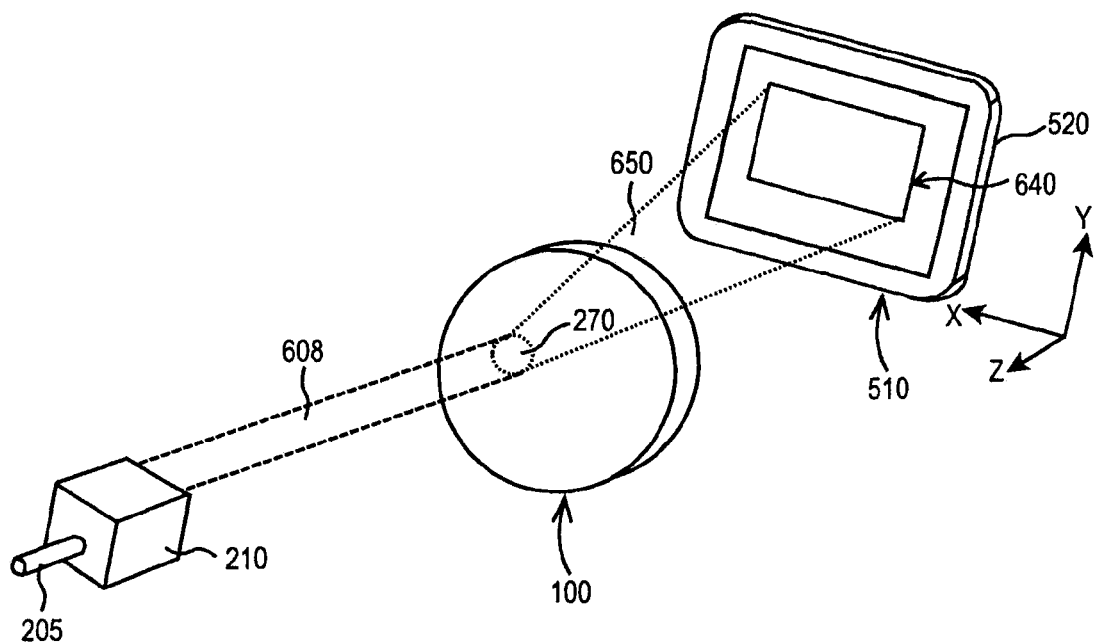
FIG. 6 is a perspective view of a second embodiment of a holographic data storage system shown decoding information encoded into the holographic data storage medium of FIGS. 1A and 1B.

FIG. 6 shows holographic data storage system 300 being used to decode interference pattern 270. In the illustrated embodiment of FIG. 6, reference beam 608 is directed toward holographic storage medium 100 such that reference beam 608 is diffracted by the interference pattern 270 to form reconstructed data beam 650 comprising image 640 which resembles the original image 240. Data beam 650 is projected onto input screen 520 of optical sensor array 510. Optical sensor array 510 then digitally captures the information comprising image 640.

Figure 9A:
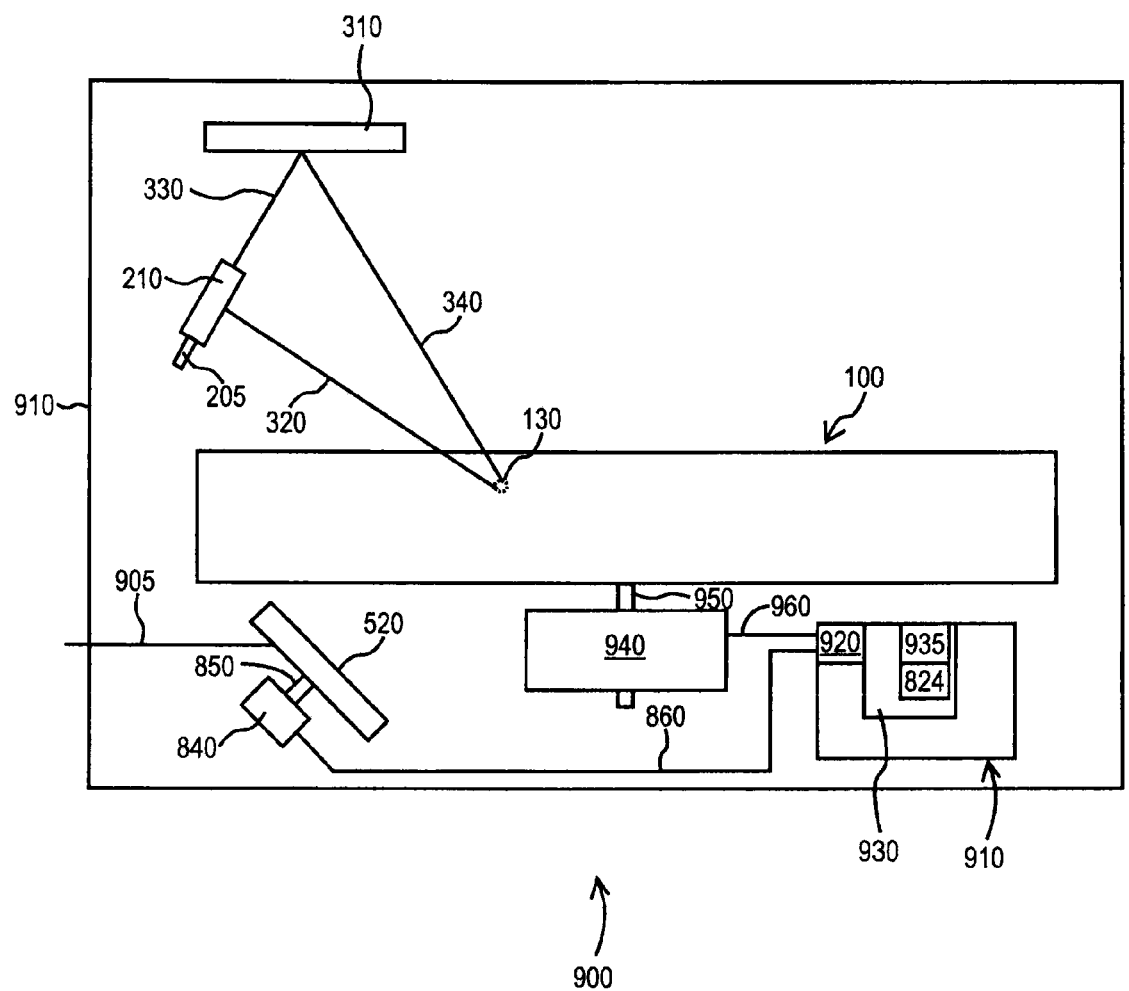
FIG. 9A is a block diagram showing Applicants' holographic drive apparatus being used to encode information in a holographic data storage medium.
Figure 9B:
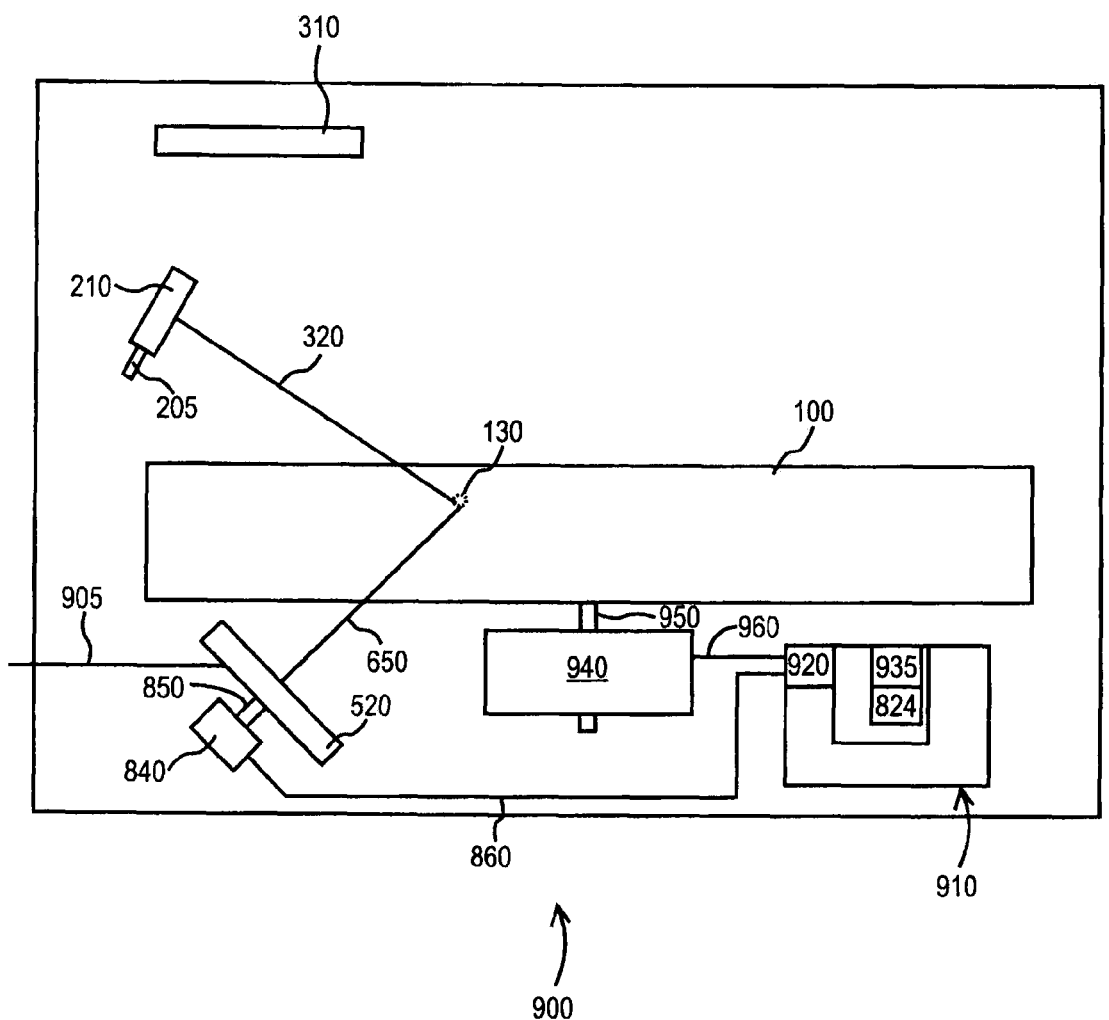
FIG. 9B is a block diagram showing the holographic drive apparatus of FIG. 9A being used to decode information written to a holographic data storage medium.

Referring now to FIGS. 9A and 9B, in certain embodiments laser light source 205, beam splitter 210, reflective spatial light modulator 310, and the rotatable input screen 520 of optical sensor array 510, are disposed within holographic drive apparatus 900. In the illustrated embodiment of FIG. 9A, holographic drive apparatus 900 further comprises housing 910.

In certain embodiments, holographic data storage medium 100 can be removeably disposed within housing 910. In the illustrated embodiment of FIG. 9A, holographic data storage medium 100 is releaseably attached to a drive servo mechanism comprising drive servo 940 and rotatable shaft 950. Drive servo rotates rotatable shaft 950 thereby causing holographic data storage medium 100 to rotate also.

In the illustrated embodiment of FIG. 9A, holographic drive apparatus 900 further comprises controller 910. Controller 910 comprises processor 920, memory 930, and microcode 935 written to memory 930. Memory 930 may also contain instructions 824. In certain embodiments, instructions 824 comprise, inter alia, equations [1-4]. Controller 910 is interconnected with drive servo 940 via communication link 960, and with RES 840 via communication link 860. Controller 910, using processor 920 and microcode 935, can cause holographic data storage medium 100 to rotate at a first rotation rate, and can simultaneously cause input screen 520 to rotate at a second rotation rate, wherein the first rotation rate may equal the second rotation rate, and wherein the first rotation rate may differ from the second rotation rate.

In certain embodiments, memory 930 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

FIG. 9A shows holographic drive apparatus 900 being used to encode data hologram 130 into holographic data storage medium 100. FIG. 9B shows holographic drive apparatus 900 being used to decode data hologram 130. In the illustrated embodiment of FIGS. 9A and 9B, data input screen 520 outputs information using communication link 905. In certain embodiments, communication link 905 is interconnected with one or more host computers. In certain embodiments, communication link 905 is interconnected with a storage controller, such as for example storage controller 760 (FIG. 7).

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises holographic data storage systems 200 and 300, and holographic drive apparatus 900.

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822, instructions 824, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

In certain embodiments, storage controller 760 converts a serial data stream into a convolution encoded data images. Those data images are transferred to an SLM 215 or an RSLM 310.

In certain embodiments, the interconnected holographic data storage systems 200, and 300, are located in different geographical places. In certain embodiments, storage controller 760 distributes information between two or more holographic data storage systems in order to protect the information.

FIGS. 1A and 1B show holographic data storage medium 100 with geometric center-of-disk 105. In the illustrated embodiment of FIG. 1B, holographic data storage medium 100 comprises Factory-written-calibration-hologram 120 (FIG. 1B), Drive-written-calibration-hologram 110 (FIG. 1B), Computer-Generated-Hologram 140 (FIG. 1B), and Data hologram 130 (FIG. 1B), disposed along data plane 150. Data plane 150 is sandwiched between substrate 104 and cover 102.

Factory-written-calibration-hologram 120 (FIG. 1B) and Computer-Generated-Hologram 140 (FIG. 1B) are disposed within the holographic data storage medium by the media manufacturer at the time of manufacture. By "at the time of manufacture," Applicants mean prior to offering the holographic data storage medium for sale, and before encoding any information, such as for example customer data, therein.

In certain embodiments, Computer-Generated-Hologram 140 (FIG. 1B) is stored on a read-only piece of media which is then physically implanted in the data plane 150 during a separate manufacturing process. In other embodiments, Computer-Generated-Hologram 140 is stamped or lithographed onto holographic data storage medium 120 along data plane 150.

Factory-written-calibration-hologram 120 (FIG. 1B) is encoded directly into holographic data storage medium 100 by at the time of manufacture. Factory-written-calibration-hologram 120 (FIG. 1B) and/or the computer generated-hologram 140 (FIG. 1B) are based on ranges of optical tolerances. For the encoding holographic drive apparatus, such optical tolerances include the refractive indices of all focusing lenses, refractive index of spatial light modulator (if a transmissive SLM is used), and refractive index of the beam splitter. For the media, these optical tolerances include the thicknesses and refractive indices of each layer of the holographic data storage medium.

Data hologram 130 (FIG. 1B) is encoded into the holographic data storage medium after purchase. The apparatus used to encode a data hologram 130 may not comprise the same apparatus later used to decode that data hologram 130 (FIG. 1B). Using a first apparatus to encode a data hologram, and a second apparatus to decode that hologram is called interchange. In certain embodiments, one or more drive-written-calibration-holograms 110 are encoded along with one or more data holograms 130 (FIG. 1B). Those one or more drive-written-calibration-holograms 110 are used to ascertain the orientation of the data holograms 130 (FIG. 1B).

Figure 10:
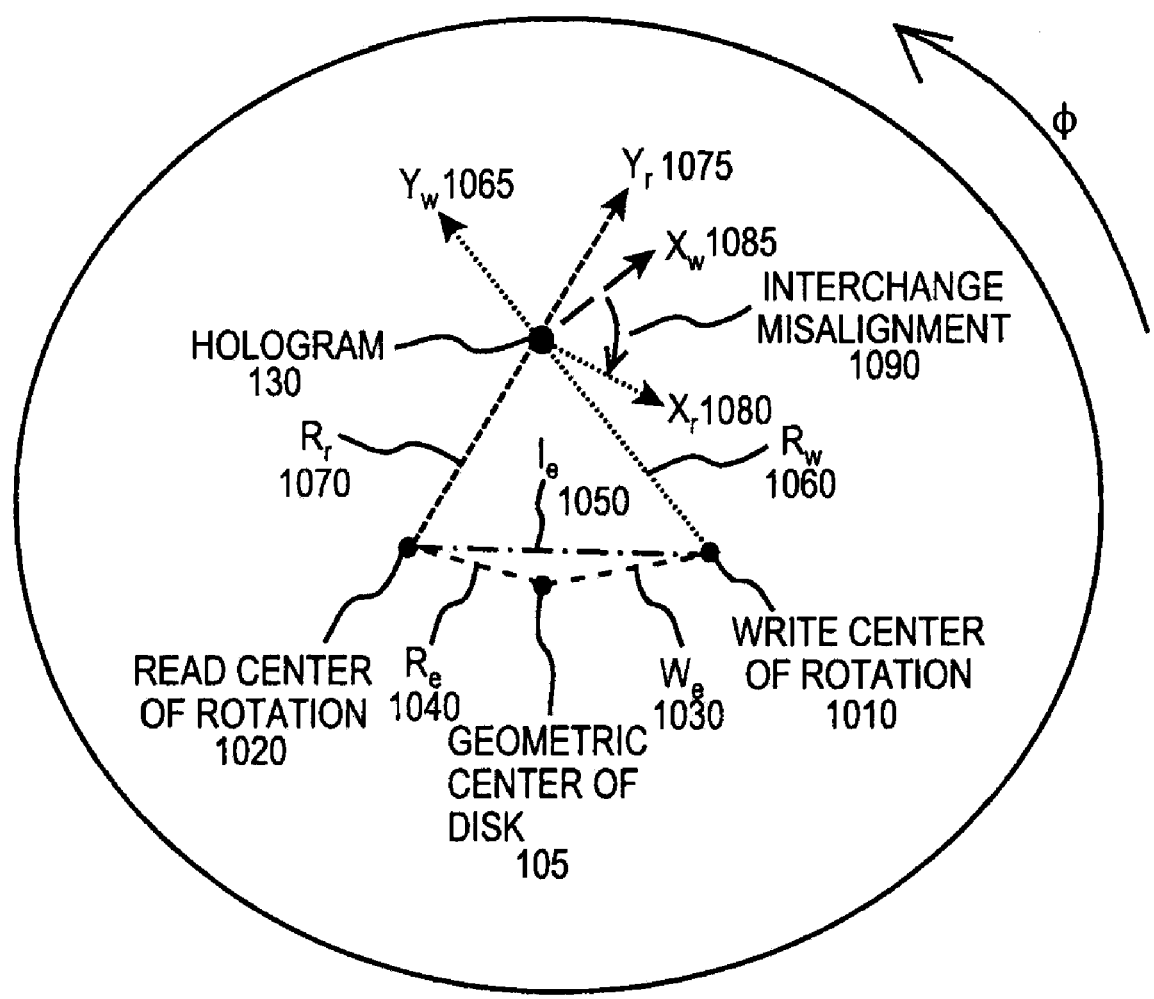
FIG. 10 is perspective view of the holographic data storage medium of FIGS. 1A and 1B.

FIG. 10 shows a top view of holographic storage media 100. Holographic storage medium 100 comprises a geometric center-of-disk 105. During a write process, holographic data storage medium 100 is rotated about the write center-of-rotation 1010. During a read process, holographic data storage medium is rotated about the read center-of-rotation 1020.

Ideally, geometric center of disk 105, write center-of rotation 1010, and read center-of-rotation 1020 coincide, as with magnetic hard disk drives. Because holographic data storage medium 100 can be removably mounted in different holographic drive apparatus 900, the geometric center-of-disk 105, write center-of-rotation 1010, and read center-of-rotation 1020 may differ. If information written to holographic storage media 120 is immediately read back, then write center-of-rotation 1010 and read center-of-rotation 1020 do coincide. As a general matter, however, the geometric center-of-disk 105, write center-of-rotation 1010, and read center-of-rotation 1020 will not coincide.

The distance between geometric center-of-disk 105 and write center-of-rotation 1010 comprises the write-eccentricity We 1030. The distance between the geometric center-of-disk 105 and the read center-of-rotation 1020 comprises the read-eccentricity Re 1040. The distance between the write center-of-rotation 1010 and the read center-of-rotation 1020 comprises the interchange-eccentricity Ie 1050.

The distance between write center-of-rotation 1010 and data hologram 130 comprises the write-radius Rw 1060. The Rw 1060 vector defines the direction Yw 1065 of the Y-axis of the data hologram. The direction of the X-axis of the data hologram, Xw 1085, is perpendicular to Yw 1065. The distance between read center-of-rotation 1020 and data hologram 130 comprises the read-radius Rr 1070. The Rr 1070 vector defines the direction Yr 1075 of the Y-axis of an image being read by an optical detector, such as optical sensor array 510. The direction of the X-axis of the detector, Xr 1080, is perpendicular to Yr 1075. Applicants' method rotates input screen 520 about the Z-axis during the read-process in order to align Xw 1085 and Yw 1065 with Xr 1080 and Yr 1075, respectively. The alignment is determined from the eccentricity during the write process and the eccentricity during the read process, the combination of these eccentricities being the interchange eccentricity Ie.

Preferably, the write center-of-rotation 1010 is located as close as possible to the geometric center-of-disk 105 when writing Factory-Write-Calibrate-Hologram 120 (FIG. 1B) or storing Computer-Generated-Hologram 140 to minimize write-eccentricity We 1030 for Factory-Write-Calibrate-Hologram 120 (FIG. 1B), or Computer-Generated-Hologram 140 (FIG. 1B). Minimizing the write-eccentricity also minimizes the interchange eccentricity Ie when reading the Factory-Precision-Write-Calibrate-Hologram 120 (FIG. 1B) or Computer-Generated-Hologram 140.

The Y-axis Yw 1065 and the X-axis Xw 1085 of the written hologram are related to the Y-axis Yr 1075 and the X-axis Xr 1080 via a matrix transformation. Angle theta ($\theta$) 1090 represents the angle of interchange-misalignment between the hologram as originally encoded using a first holographic drive apparatus, and an optical detector disposed in a second holographic drive apparatus decoding that hologram. Angle theta will vary between the write drive and the read drive, and will also vary each time holographic data storage medium 100 is mounted to the same holographic drive apparatus. It is this angle theta 1090 that is corrected by RES 840.

Because of the variation of angle theta, it is desirable to cache images and encode a plurality of data holograms at one time. Thus, once the interchange angle theta is determined for anyone of those images, it is determined for all of those images written at the same time, as a function of phi ($\phi$) which represents the angular or "spin" rotation of holographic data storage medium 100 about the Z-axis by the holographic drive apparatus, FIGS. 1A, 1B, 10.

The angle of interchange-misalignment $\theta$ 1090 is related to the interchange eccentricity Ie by Equation (1).

$$Ie^e = Rw^2 + Rr^2 - 2(Rw)(Rr)\cos(\theta) \qquad (1)$$

Solving for angle $\theta$, and assuming that Ie is small, meaning that Rw=Rr=R, Equation (2) is derived:

$$\cos(\theta) = [2*R^2 - Ie^2]/2*R^2 = 1 - (Ie/R)^2/2 \qquad (2)$$

Solving for the sine of angle $\theta$, Equation (3) is derived.

$$\sin(\theta) = (Ie/R)*[1 - (Ie/R)^2/4]^{1/2} \qquad (3)$$

Using Equations (2) and (3), the following matrix transformation, Equation (4), is constructed with write vector (Xw, Yw), read vector (Xr,Yr), and rotation matrix [M].

$$\begin{vmatrix} Xr \\ Yr \end{vmatrix} = \begin{vmatrix} M(1,1) & M(1,2) \\ M(2,1) & M(2,2) \end{vmatrix} * \begin{vmatrix} Xw \\ Yw \end{vmatrix} \quad (4)$$

where the elements of matrix [M] are:

$M(1,1)=M(2,2)=1-(Ie/R)^2/2$ $M(1,2)=-M(2,1)=(Ie/R)[1-(Ie/R)^2/4]^{1/2}$

Ie=(e) sin (φ), where angle phi (φ) represents the angular or "spin" rotation of holographic data storage medium 100 about the Z-axis by the holographic drive apparatus, FIGS. 1A, 1B, 10.

Thus, the elements of matrix [M] vary periodically with the rotation of the disk in the drive, and the detector input screen 520 will rotate counterclockwise and clockwise about the Z-axis to account for angle φ of the spin of disk 100 in addition to detector input screen 520 rotating about the Z-axis to correct for angle θ. Angle φ is zero when write center-of-rotation 1010 and read center-of-rotation 1020 are aligned. The determinant of matrix [M] equals one, as desired, so that no image distortion is created by matrix [M].

Preferably, matrix [M] is close to the identity matrix as possible when writing Factory-Write-Calibrate-Hologram 120 (FIG. 1B) or storing Computer-Generated-Hologram 140 (FIG. 1B). One step in Applicants' method comprises centering holographic data storage medium 100 about the geometric center of-disk 105 when writing Factory-Write-Calibrate-Hologram 120 (FIG. 1B) or storing Computer-Generated-Hologram 140 (FIG. 1B) at the time of manufacture.

For ease of input screen 520 tracking the encoded holograms, matrix [M] preferably varies only by angle φ for an entire circular track of data. In certain embodiments, Applicants' method encodes an entire track of data holograms at a time, in order that input screen 520 not erratically and unpredictably jump from one orientation to another about the Z-axis, when reading data holograms 130 (FIG. 1B). That data track may comprise either a circular or a spiral arc.

When decoding reconstructed data beams, optical sensor array 510 utilizes angle θ, wherein angle θ varies with the rotation of the angle φ as well as the write center-of-rotation 1010 and the read center-of-rotation 1020. One or more Drive-Written-Calibrate-Holograms 110 (FIG. 1B) are preferably written by the drive when each data track is written, to aid in the alignment of input screen 520 with the data hologram 130 (FIG. 1B) to be read.

In certain embodiments, Applicants' method mounts a holographic data storage medium, such as holographic data storage medium 100 in a holographic drive apparatus, such as holographic drive apparatus 900. The method then rotates the holographic data storage medium, encodes in the rotating holographic data storage medium a first drive-written hologram comprising an alignment pattern, encodes in the rotating holographic data storage medium one or more data holograms comprising information, and encodes in the rotating holographic data storage medium a second drive-written hologram comprising the alignment pattern, wherein the first drive-written hologram, the one or more data holograms, and the second drive-written hologram define a circular track.

Figure 11:
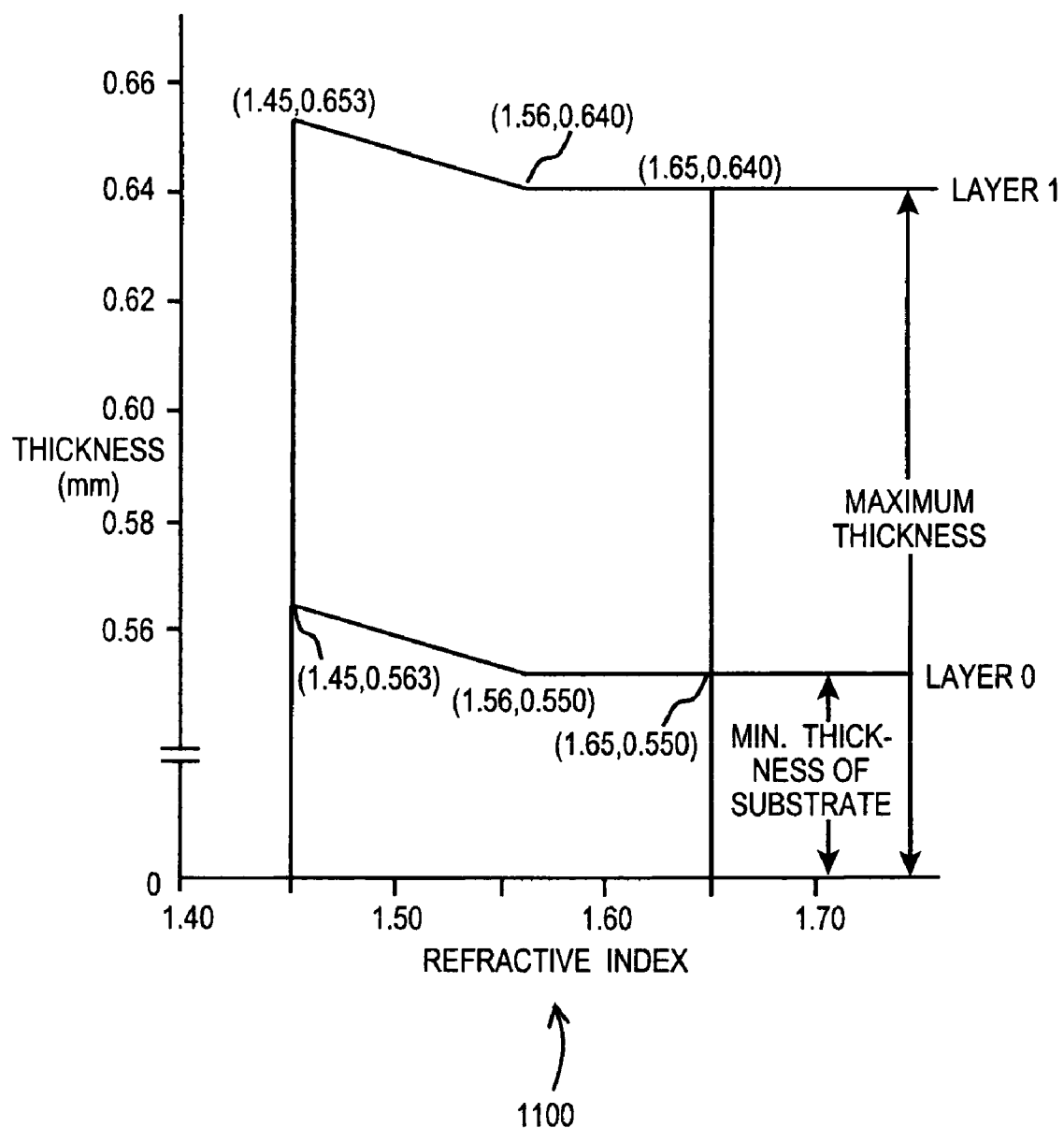
FIG. 11 is a chart illustrating certain properties of the holographic data storage medium of FIGS. 1A and 1B.
Figure 13:
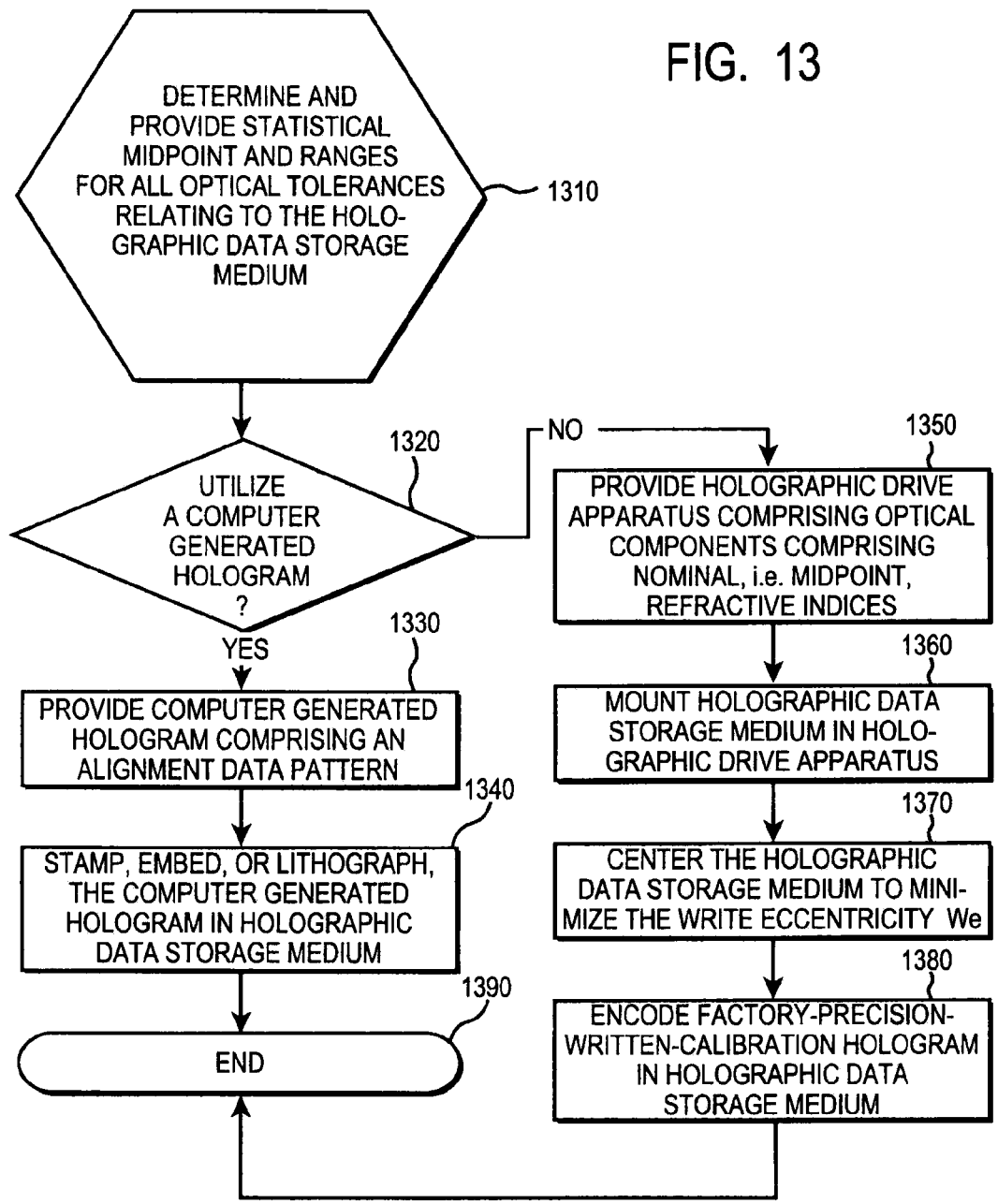
FIG. 13 is a flow chart summarizing certain steps of Applicants' method to dispose a hologram comprising an orientation pattern into the holographic data storage medium of FIGS. 1A and 1B.

FIG. 13 summarizes the steps of Applicants' method to dispose a Computer generated hologram 140 (FIG. 1B) comprising an alignment pattern, or a Factory-Written Calibrate Hologram 120 (FIG. 1B) comprising an alignment pattern, in a holographic data storage medium at the time of manufacture. In step 1310, Applicants' method determines the statistical midpoint and ranges of all optical tolerances relating to the holographic data storage medium. In certain embodiments, the optical tolerances of step 1310 include one or more of the thicknesses and refractive indices of each layer of the holographic data storage medium. Referring now to FIG. 11, an example optical tolerances is shown via graph 1100 of medium thicknesses versus refractive indices of each layer of media 100. In FIG. 11, layer 0 may represent cover 102 and layer 1 may represent substrate 104, for transmissive holographic media 100.

Referring once again to FIG. 13, in step 1320 Applicants' method determines whether to dispose one or more computer generated holograms (GCH) 140 (FIG. 1B) in the holographic data storage medium. If Applicants' method elects in step 1320 to dispose a computer generated hologram comprising an orientation pattern in the holographic data storage medium, then the method transitions from step 1320 to step 1330 wherein the method provides a master of a computer generated hologram 140 comprising orientation pattern 1200 (FIG. 12) at the statistical midpoint and statistical "corners" (extremes) of the optical path.

Figure 12:
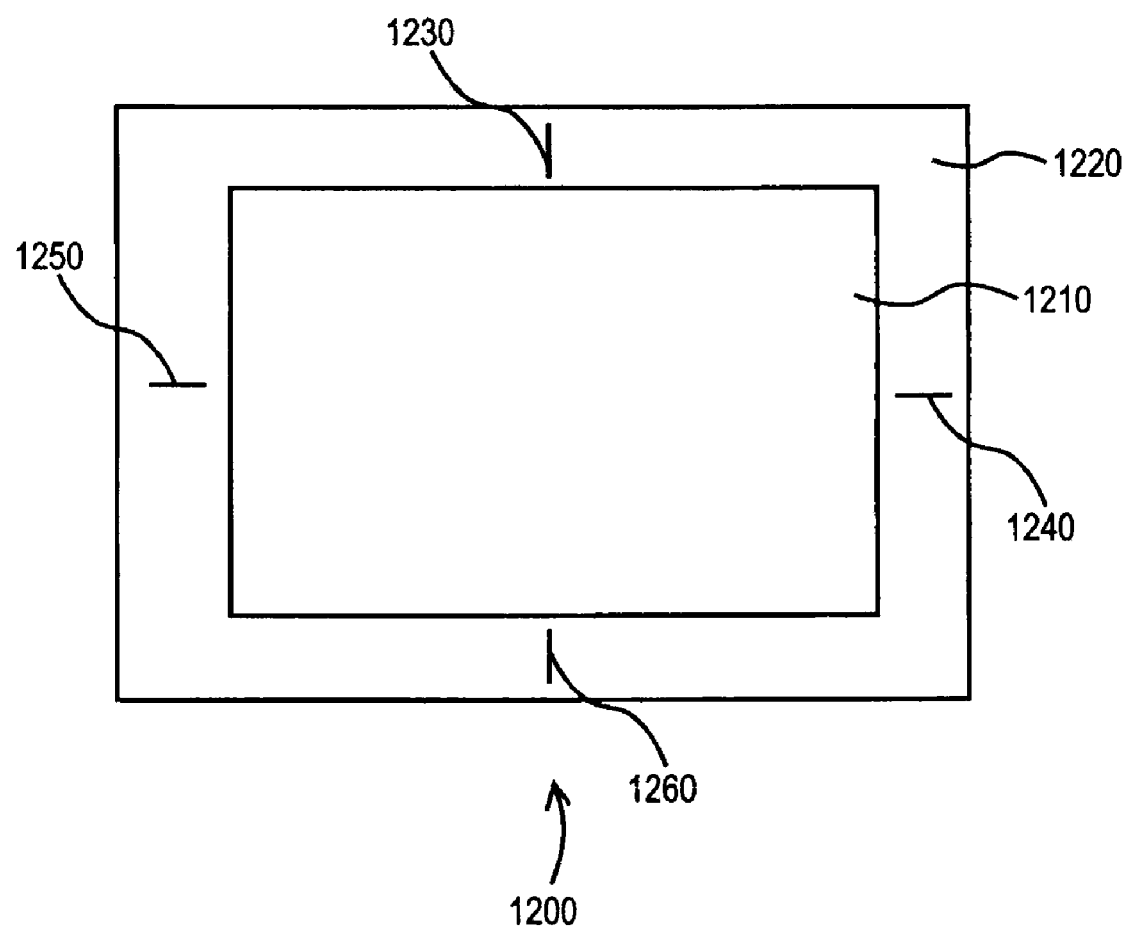
FIG. 12 is block diagram showing one embodiment of Applicants' alignment pattern.

Referring now to FIG. 12, alignment pattern 1200 includes alignment area 1220 comprising the outer periphery and contains alignment marks 1230, 1240, 1250, and 1260, for the determination of angle theta by optical sensor array 510 for use by rotation error servo RES 840 (FIGS. 8A, 8C, 9A, 9B). The alignment marks 1230, 1240, 1250, and 1260, are disposed on the outer periphery to give the maximum precision to the determination of angle theta 1090. Data 1210 is surrounded by alignment area 1220. Data 1210 may comprise Factory-written-calibration-hologram 120 (FIG. 1B), Drive-written-calibration-hologram 110 (FIG. 1B), Computer-Generated-Hologram 140 (FIG. 1B), and Data hologram 130 (FIG. 1B).

In certain embodiments, the master of a computer generated hologram) comprises a bit stream suitable for use in a laser writer, such as similar to a DVD-ROM master writer, for producing a stamped or written calibration hologram. In certain embodiments, the master comprises a two-dimensional interference-pattern for use in a photolithographic or lithographic-immersion stepper tool to produce a specific pattern. In certain embodiments, the master comprises a three-dimensional interference pattern for use in a holographic imaging writer.

In step 1340, Applicants' method disposes the computer-generated hologram comprising an alignment pattern 1200 (FIG. 12) in the holographic data storage medium at the time of manufacture. In certain embodiments, step 1340 comprises stamping, embedding, or lithographing the computer generated hologram comprising an alignment pattern, such as for example CGH 140 (FIG. 1B) in the holographic data storage medium, such as holographic data storage medium 100. In certain embodiments, that CGH 140 is disposed along data plane 150 (FIG. 1B).

If Applicants' method elects in step 1320 not to dispose a computer generated hologram 140 (FIG. 1B) in the holographic data storage medium, then the method transitions from step 1320 to step 1350 wherein the method provides a holographic drive apparatus, such as holographic drive apparatus 900 (FIGS. 9A, 9B), and wherein a ray trace is made of that holographic drive apparatus to determine the "footprint" of its optical properties, and wherein the optical components of the drive are selected with nominal (midpoint) refractive indices, per drive specifications. In certain embodiments, the optical properties of step 1350 comprise the refractive indices of all focus lenses, refractive index of spatial light modulator if a transmissive SLM is used, and the refractive index of the beam splitter.

In step 1360, Applicants' method mounts the holographic data storage medium 100 is mounted on the holographic drive apparatus of step 1350. In step 1370, the holographic data storage medium is centered in the holographic drive apparatus to minimize write eccentricity We 1030, and hence reduce interchange eccentricity Ie 1050 when subsequently reading the Factory-Precision-Written-Calibrate-Holograms 120 (FIG. 1B) encoded in the holographic data storage medium in step 1380, to include an alignment pattern 1200 (FIG. 12). In certain embodiments, step 1370 utilizes the method described in U.S. Patent Application 2004/0061966A1, which is hereby incorporated by reference. Applicants' method reduces the magnitude of eccentricity e, and thus Ie, in Equation (4) by a factor of two if the statistical distribution of read center-of-rotation 1020 is uniform. In step 1380, Applicants' method encodes a Factory-written-calibration-hologram 120 (FIG. 1B) into the holographic data storage medium 100.

Figure 14:
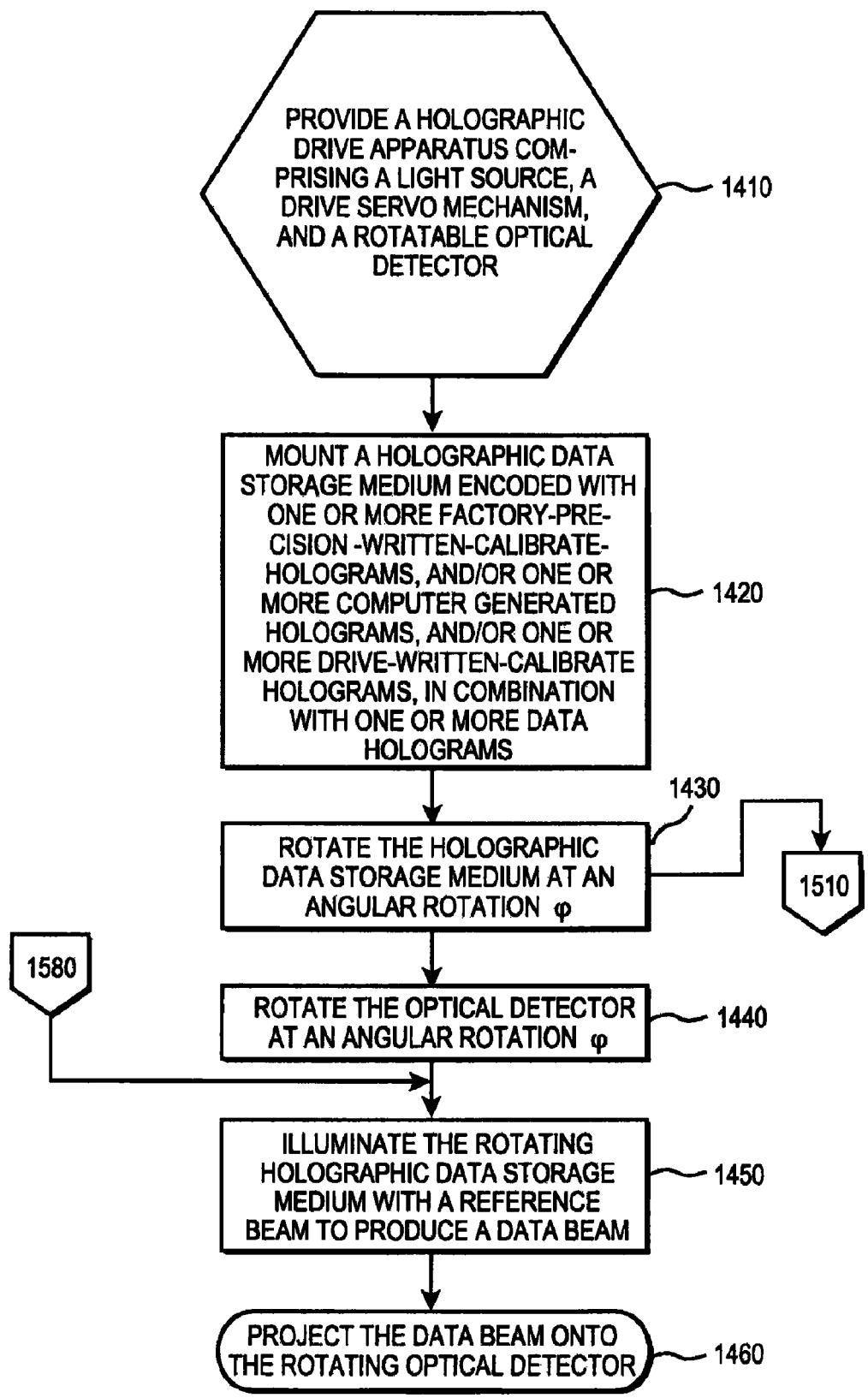
FIG. 14 is a flow chart summarizing the steps of Applicants' method to decode information encoded into the holographic data storage medium of FIGS. 1A and 1B.

Applicants' invention includes a method to read images encoded into a holographic data storage medium, such as holographic data storage medium 100. Referring now to FIG. 14, in step 1410 Applicants' method provides a holographic drive apparatus, such as holographic drive apparatus 900 (FIGS. 9A, 9B).

In step 1420, Applicants' method mounts a holographic data storage medium comprising one or more Factory-Precision-Written-Calibrate-Holograms 120 (FIG. 1B), and/or one or more computer-generated holograms 140 (FIG. 1B), and/or one or more Drive-written-calibration-holograms 110 (FIG. 1B), and further comprising information encoded as one or more data holograms 130. Each of these holograms 120, 140, 110, and 130 further comprise an alignment pattern 1200 (FIG. 12).

In step 1430, Applicants' method rotates the mounted holographic data storage medium of step 1420 at an angular rotation φ. In step 1440, Applicants' method rotates the rotatable optical detector, such as optical sensor array 510, at an angular rotation φ.

In step 1450, Applicants' method illuminates the rotating holographic data storage medium with a reference beam to generate a plurality of data beams. In step 1460, Applicants' method projects the plurality of data beams generated in step 1450 onto the rotating optical sensor array 510.

Figure 15:
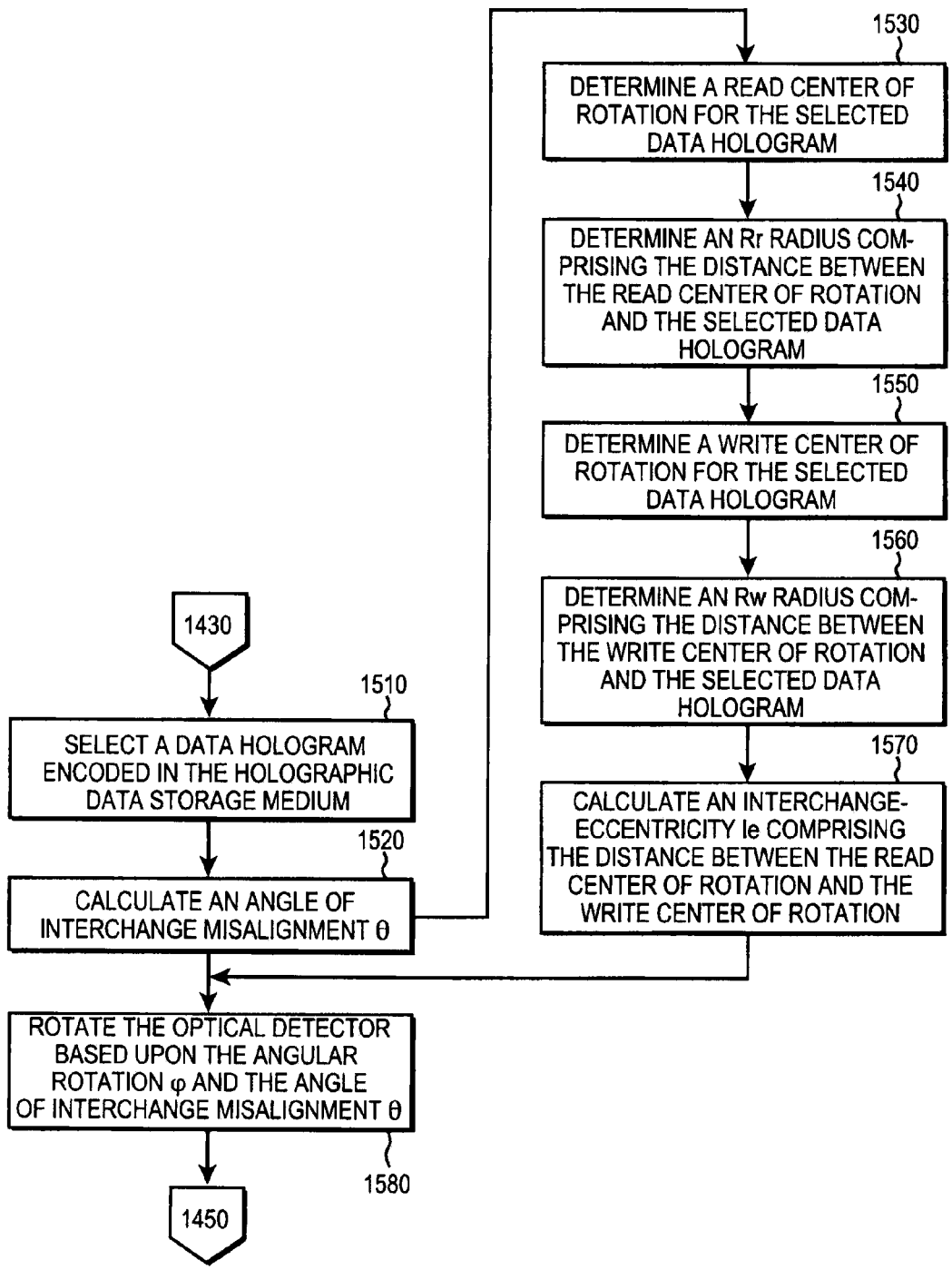
FIG. 15 is a flow chart summarizing certain addition steps of Applicants' method to decode information encoded into the holographic data storage medium of FIGS. 1A and 1B.

In certain embodiments, step 1440 is replaced by the steps illustrated in FIG. 15. Referring now to FIG. 15, in step 1510 Applicants' method selects a data hologram, such as data hologram 130 (FIG. 1B), encoded in the holographic data storage medium of step 1420 (FIG. 14). In step 1520, Applicants' method calculates an angle of interchange misalignment θ 1090, such as by use of equations [1-4]. In step 1580, Applicants' method rotates the optical sensor array 510 of step 1410 based upon both the angular rotation φ and the angle of interchange misalignment θ 1090.

In certain embodiments, step 1520 comprises steps 1530 through 1570. In step 1530, Applicants' method determines a read center of rotation for the selected data hologram. In certain embodiments, step 1530 further comprises reading one or more encoded Factory-Precision-Written-Calibrate-Holograms 120 (FIG. 1B), and/or one or more computer generated holograms 140 (FIG. 1B), and using the one or more alignment patterns comprising those one or more Factory-Precision-Written-Calibrate-Holograms 120 (FIG. 1B), and/or one or more computer generated holograms 140 (FIG. 1B), to determine that read center of rotation. In step 1540, Applicants' method determines a Rr radius comprising the distance between the read center of gravity and the location of the selected data hologram.

In step 1550, Applicants' method determines a write center of rotation for the selected data hologram. In certain embodiments, step 1550 further comprises reading one or more encoded Drive-Written-Calibrate-Holograms 110 (FIG. 1B), and using the one or more alignment patterns comprising those one or more Drive-Written-Calibrate-Holograms 110 (FIG. 1B) to determine the write center of rotation. In step 1560, Applicants' method determines a Rw radius comprising the distance between the write center of gravity and the location of the selected data hologram.

In step 1570, Applicants' method calculates an interchange-eccentricity Ie comprising the distance between the read center of gravity of step 1530 and the write center of gravity of step 1550. Applicants' method utilizes the write center of gravity of step 1530, the Rr radius of step 1540, the read center of gravity of step 1550, the Rw radius of step 1560, and the interchange-eccentricity Ie of step 1570 to calculate the angle of interchange misalignment θ 1090 in step 1520 via equations [1-4].

Applicants' method as summarized in FIG. 14, optionally using the steps summarized in FIG. 15, may be used by a storage services provider to provide data storage services to one or more data storage services customers.

In certain embodiments, individual steps recited in FIG. 13, 14, and/or 15, may be combined, eliminated, or reordered.

In certain embodiments, Applicants' invention includes instructions, such as instructions 824 (FIGS. 7, 8A, 9A), residing in memory 763 (FIG. 7), and/or memory 830 (FIG. 8A), and/or memory 930 (FIG. 9A), where those instructions are executed by a processor, such as processor 764 (FIG. 7), and or processor 820 (FIG. 8A), and/or processor 920 (FIG. 9A), to perform one or more of steps 1360, 1370, and/or 1380, recited in FIG. 13, and/or one or more to steps 1420, 1430, 1440, and/or 1450, recited in FIG. 14, and/or one or more of steps 1510, 1520, 1530, 1540, 1550, 1560, 1570, and/or 1580, recited in FIG. 15.

In certain embodiments, Applicants' invention includes instructions residing in any other computer program product, where those instructions are executed by a computer external to, or internal to, holographic data storage system 200, holographic data storage system 300, holographic data storage and retrieval system 700, and/or holographic drive apparatus 900, to perform one or more of steps 1360, 1370, and/or 1380, recited in FIG. 13, and/or one or more to steps 1420, 1430, 1440, and/or 1450, recited in FIG. 14, and/or one or more of steps 1510, 1520, 1530, 1540, 1550, 1560, 1570, and/or 1580, recited in FIG. 15. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A holographic drive apparatus, comprising:
   a housing;

a laser light source disposed within said housing;
a beam splitter disposed within said housing;
a reflective spatial light modulator disposed within said housing;
a drive servo mechanism disposed within said housing;
an optical sensor array disposed within said housing;
wherein said optical sensor array comprises:
a rotatable input screen;
a rotation error servo;
a rotatable shaft extending outwardly from said rotation error servo;
wherein the distal end of said rotatable shaft is attached to said rotatable input screen.

2. The holographic drive apparatus of claim 1, further comprising a controller, wherein said controller is in communication with said drive servo and with said rotation error servo.

* * * * *